3,716,637
PHARMACEUTICAL PREPARATIONS
Georg Anner and Jaroslav Kalvoda, Basel, Switzerland, assignors to Ciba-Geigy Corporation, Ardsley, N.Y.
No Drawing. Filed Sept. 30, 1970, Ser. No. 77,002
Int. Cl. A61k 17/00
U.S. Cl. 424—243    7 Claims

ABSTRACT OF THE DISCLOSURE

A pharmaceutical preparation containing as active substance 3,20-dioxo-6α-methyl-17α-acetoxy-19-nor-Δ$^4$-pregnene.

---

The present invention provides pharmaceutical preparations containing 3,20-dioxo-6α-methyl-17α-acetoxy-19-nor-Δ$^4$-pregnene, and their manufacture.

The new pharmaceutical preparations possess valuable pharmacological properties. Thus, they have an especially high progestatic and anti-ovulatory activity. They are therefore primarily suitable for use as gestagens and for regulating fertility. This can be shown by animal tests, in which the said active substance, for example, when administered subcutaneously to rabbits, causes a progestatic action at 0.0001 to 0.001 mg. per kg. per day or at 0.001 to 0.03 mg. per kg. per day when administered per os. The anti-ovulatory activity can be shown, for example, by inhibiting the spontaneous ovulation of rats, which occurs with subcutaneous administration at doses of 0.003 to 0.03 mg. per kg. per day and with oral administration at doses of 0.01 to 0.3 mg. per kg. per day.

The new preparations contain the active substance together with a pharmaceutical carrier, especially a carrier suitable for enteral or parenteral administration. It may be liquid or solid, and especially suitable are those substances that do not react with the new compound, such as water, gelatine, lactose, starches, magnesium stearate, talc, vegetable oils, benzyl alcohols, gums, polyalkylene glycols or other known carriers for medicaments. The new preparations may be in the form, for example, of tablets, dragées, capsules or in liquid form as solutions or primarily suspensions. If desired, they may be sterilised and/or may contain auxiliary substances, such as preserving agents or stabilising agents, salts for regulating the osmotic pressure or buffers. They may also contain further pharmacologically active substances that are known to be suitable for the above-mentioned purpose.

The new preparations contain, for example, for oral administration, advantageously in the form of tablets, dragées or capsules, advantageously 1 to 100 mg. of the active substance per dosage unit, and preferably 5 to 50 mgs. The dosage of the new preparations depends on the needs of individual patients.

The preparations are obtained by methods in themselves known for formulating medicaments. The invention also includes the use of the aforesaid active substance or of preparations containing this active substance as a gestagen or for regulating fertility.

The active substance can be obtained, for example, by reducing a 3-enol-ether of 3,20-dioxo-6-formyl-17α-acetoxy-19-nor-Δ$^4$-pregnadiene and isolating the 3,20-dioxo-6α-methyl-17α-acetoxy-19-nor-Δ$^4$-pregnene from the resulting mixture, if desired, after isomerisation by means of a strong acid, such as hydrochloric acid. The reduction of the 6-formyl-compound is advantageously carried out with palladium-carbon in cyclohexene, whereby a mixture of the 6α- and 6β-methyl isomers is obtained. An initial portion of the desired 6α-methyl-compound can be obtained from the latter mixture by chromatography. The isomerisation is carried out more especially with a strong acid. These reactions are carried out by methods in themselves known. The following examples illustrate a few pharmaceutical preparations in accordance with the invention, but without limiting the invention:

EXAMPLE 1

Oily injection solution:

Composition: Mg.
3,20-dioxo-6α-methyl - 17α - acetoxy-19-nor-Δ$^4$-pregnene _____ 100
Benzyl benzoate _____ 350
Benzyl alcohol _____ 90
Sesame oil to make 1.0 ml.

The active substance is dissolved in a mixture of benzyl benzoate and benzyl alcohol at 40° C., and there is added to the clear solution, whilst stirring, a quantity of sesame oil, heated to 40° C., such that the solution contains per ml. 100.0 mg. of the active substance. The solution is filtered sterile in the usual manner and is charged into ampoules under aseptic conditions.

EXAMPLE 2

Oily injection solution:

Composition: Mg.
3,20 - dioxo-6α-methyl - 17α - acetoxy-19-nor-Δ$^4$-pregnene _____ 30.0
Benzyl alcohol _____ 90.0
Sesame oil to make 1.0 ml.

The active substance is dissolved in benzyl alcohol at 40° C. To the clear solution there is added, while stirring, the quantity of sesame oil, heated to 40° C., such that the solution contains per ml. 30.0 mg. of active substance. The solution is filtered sterile in the usual manner and is charged into ampoules under aseptic conditions.

EXAMPLE 3

Injection suspension:

Composition: Mg.
3,20 - dioxo-6α-methyl - 17β - acetoxy-19-nor-Δ$^4$-pregnene _____ 10.0
Sodium carboxymethyl-cellulose of sodium viscosity _____ 5.0
Sodium chloride _____ 7.5
Primary sodium phosphate _____ 1.5
Secondary sodium phosphate _____ 1.5
Polyvinyl-pyrrolidone _____ 0.5
Sodium ethyl-mercury-thiosalicylate _____ 0.02
Distilled water to make 1.0 ml.

The sterile microcrystals of the active substance are suspended under aseptic conditions in the previously prepared and sterilised vehicle. The homogeneous suspension is charged under aseptic conditions into previously heat-sterilised ampoules of 1 ml. capacity, and the ampoules are sealed so that each contains 10.0 mg. of active substance per ml. of suspension.

EXAMPLE 4

Hormone tablets:

Composition per tablet: Mg.
3,20 - dioxo-6α-methyl-17β-acetoxy19-nor-Δ$^4$-pregnene _____ 5.0
Lactose _____ 80.0
Aerosil _____ 7.0
Wheat starch _____ 46.0
Talc _____ 6.3
Magnesium stearate _____ 0.7

145.0

The active substance is first mixed homogeneously with a part of the lactose, this mixture is then mixed with the remainder of the lactose, and the aerosil and a part of the starch, the mixture is then moistened with water and granulated in the usual manner and dried. The remainder of the starch, the talc and the magnesium stearate are then admixed with the dry granulate, and the homogeneous mixture is pressed to form tablets each weighing 145.0 mg.

The active substance can be obtained, for example, in the following manner:

2.0 grams of palladium-carbon (of 10% strength) are triturated with 4 ml. of glacial acetic acid, the palladium-carbon is filtered off after about 5 minutes, then washed with methanol until it has a neutral reaction and is transferred to a reaction vessel with about 10 ml. of methanol. Then 10.0 grams of 3-methoxy-6-formyl-17α-acetoxy-20-oxo-$\Delta^{3,5}$-19-nor-pregnadiene and 20 ml. of freshly distilled cyclohexene are added, and the whole is stirred for 18 hours at the boil under a reflux condenser. The reaction mixture is cooled to room temperature, filtered to remove the catalyst, 7.4 grams of magnesium silicate are added, boiled under reflux for 15 minutes, then cooled, diluted with ether, filtered, and evaporated under reduced pressure produced by a water-jet vacuum. The crude product (9.1 grams) so obtained is dissolved in 100 ml. of toluene, and the solution is chromatographed over 50 times its weight of silicagel. The 6α-methyl-17α-acetoxy-19-nor-progesterone is present in the first fractions obtained by eluting with a mixture of toluene and ethyl acetate (90:10). When recrystallised from a mixture of methylene chloride and ether the compound melts at 163–165° C. The epimeric 6β-methyl-derivative is concentrated in the mother liquors and the higher chromatogram fractions. For the purpose of isomerisation in the 6-position the mixture is dissolved in chloroform and the solution is saturated with hydrogen chloride, while cooling. After 1 hour nitrogen is blown through the yellowish reaction solution for 15 minutes, the solution is then washed with water, a solution of sodium hydrogen carbonate and then with water, dried and evaporated under reduced pressure produced by a water-jet vacuum. By chromatography over silicagel (see above) followed by crystallisation further quantities of pure 6α-methyl-17α-acetoxy-19-nor-progesterone melting at 163–165° C. are obtained.

The formyl-compound used as starting material is prepared, for example, as follows: 13.0 grams of 17α-acetoxy-19-norprogesterone are dissolved in 160 ml. of benzene. About 25 ml. of the solvent are distilled off, 6.5 ml. of freshly distilled o-formic acid methyl ester, 0.65 ml. of methanol and 130 mg. of p-toluene sulphonic acid are added and the whole is boiled under reflux, while stirring, for 2½ hours. A further portion (10 ml.) of the solvent is then distilled off in the course of 30 minutes, the mixture is cooled and, after the addition of 1.3 ml. of pyridine, it is diluted with ether, and the mixture is washed in succession with a saturated solution of sodium hydrogen carbonate and water, then dried, and evaporated under reduced pressure produced by a water-jet vacuum. Crystallisation of the residue from methanol (in the presence of small amounts of pyridine) yields 3-methoxy-17α-acetoxy-20-oxo-$\Delta^{3,5}$-19-norpregnadiene.

10.0 grams of the latter compound are dissolved in 25 ml. of methylene chloride, and there is added dropwise at 6° C. the Vilsmeier reagent produced from 5.8 grams of dimethylformamide and 3 ml. of phosphorus oxychloride in 20 ml. of methylene chloride at 0° C. The red solution is stirred for 2 hours at 0° C., and is then allowed to heat up within 1 hour to 18° C. It is then cooled to about 5° C., a suspension of 22 grams of anhydrous sodium acetate in 70 ml. of methanol of 90% strength is added, and the whole is stirred for 30 minutes at room temperature. The whole is then diluted with water and methylene chloride, the organic layer is washed in succession with water twice, then once with a solution of potassium carbonate of 4% strength, and once with water, the washing water is then extracted with methylene chloride, dried and evaporated under reduced pressure produced by a water-jet vacuum.

The crude 3-methoxy-6-formyl-17α-acetoxy-20-oxo-$\Delta^{3,5}$-19-norpregnadiene (ultra-violet spectrum: $\lambda$ max./$\epsilon$= 220/10000 and 320/14500) is subjected to reduction without purification.

What is claimed is:

1. A pharmaceutical preparation comprising 3,20-dioxo-6α-methyl-17α-acetoxy-19-nor-$\Delta^4$-pregnane and a pharmaceutical carrier.

2. A pharmaceutical preparation as claimed in claim 1 in the form of an oily injection solution.

3. A pharmaceutical preparation as claimed in claim 1 in the form of an injection suspension.

4. A pharmaceutical preparation as claimed in claim 1 in the form of tablets, dragées or capsules.

5. A pharmaceutical preparation as claimed in claim 4, wherein it contains 1–100 mg. of active substance per dosage unit.

6. A pharmaceutical preparation as claimed in claim 5, wherein it contains 5–50 mg. of active substance per dosage unit.

7. A method for regulating fertility in mammals which comprises administering to said mammal a progestatic and anti-ovulatory effective amount of 3,20-dioxo-6α-methyl-17α-acetoxy-19-nor-$\Delta^4$-pregnene.

References Cited
UNITED STATES PATENTS
3,488,346  1/1970  Dorfman et al. ____ 260—239.55

SHEP K. ROSE, Primary Examiner

U.S. Cl. X.R.
260—397.4